J. BELLINI.
ICE CREAM CUTTING AND WRAPPING MACHINE.
APPLICATION FILED OCT. 23, 1909.
983,421.
Patented Feb. 7, 1911.
4 SHEETS—SHEET 3.
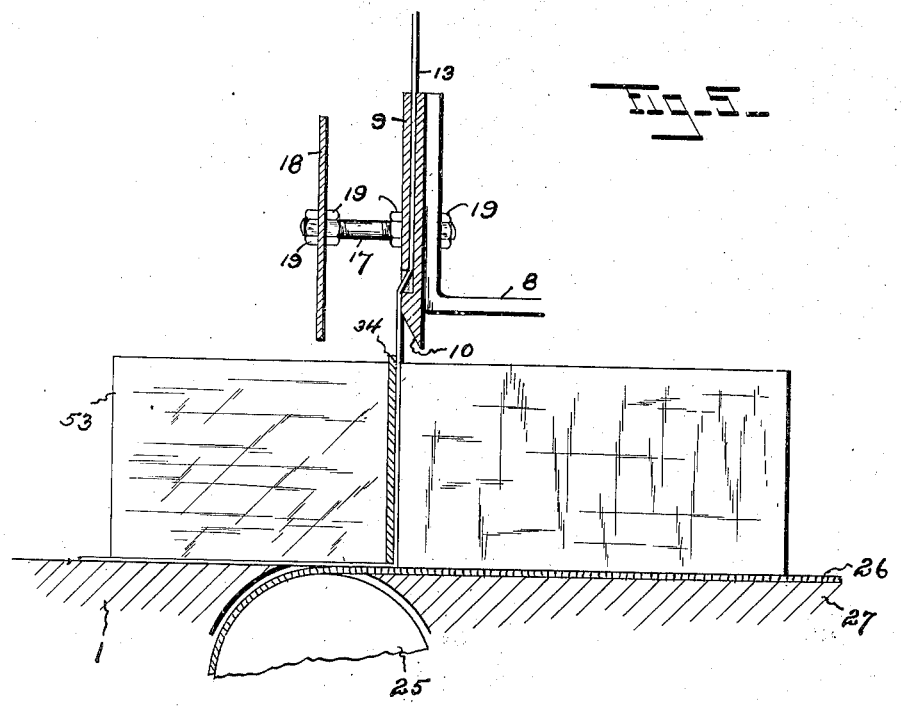
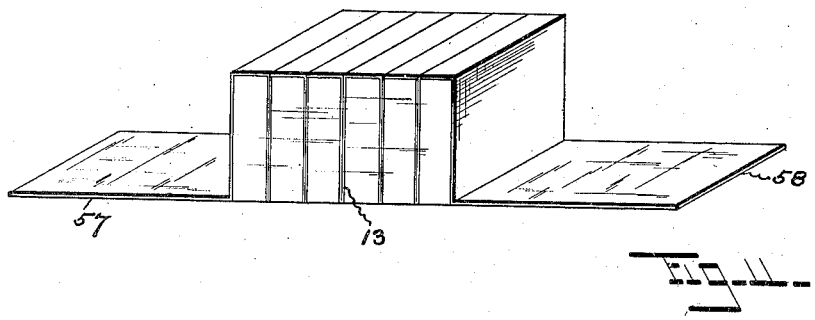

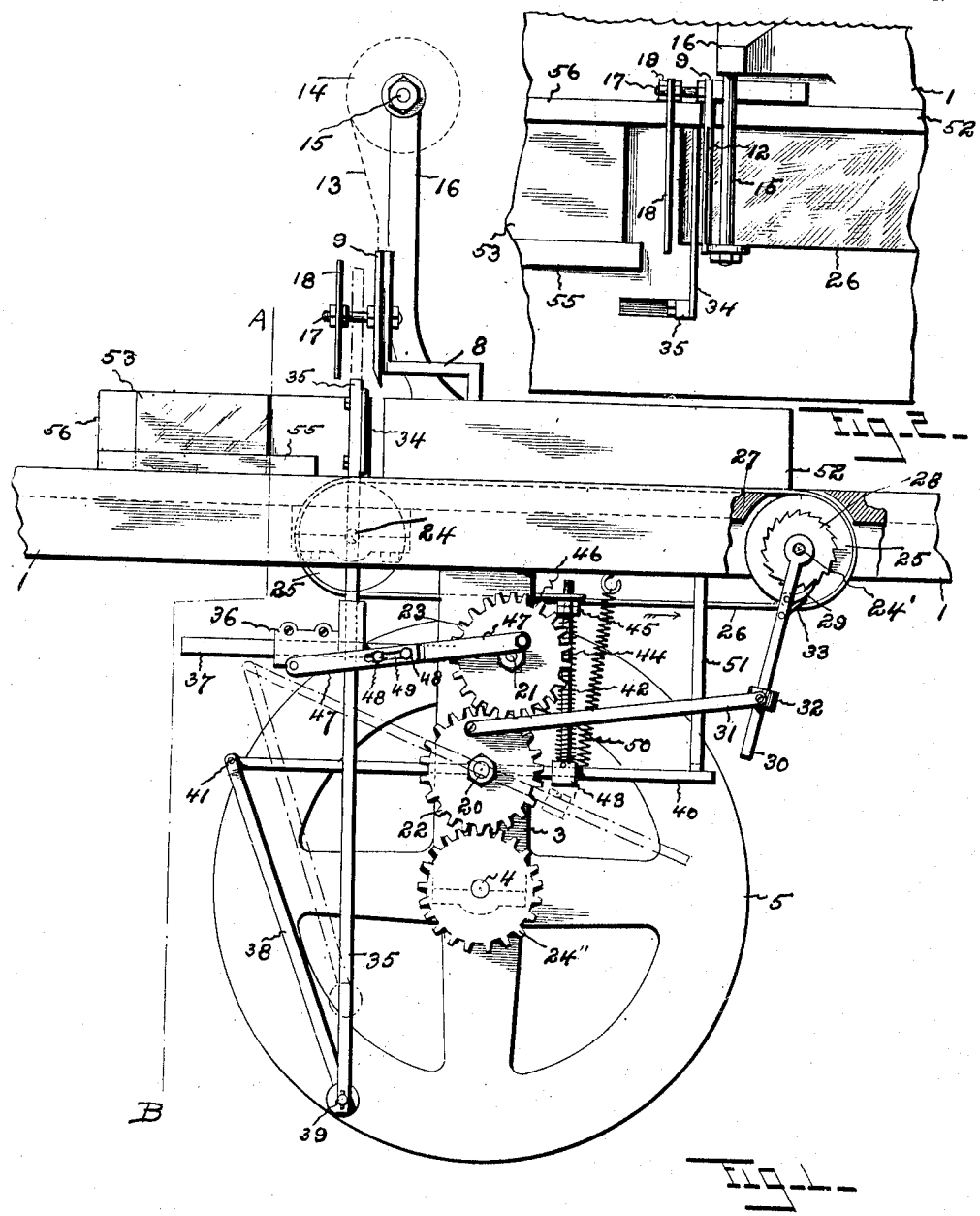

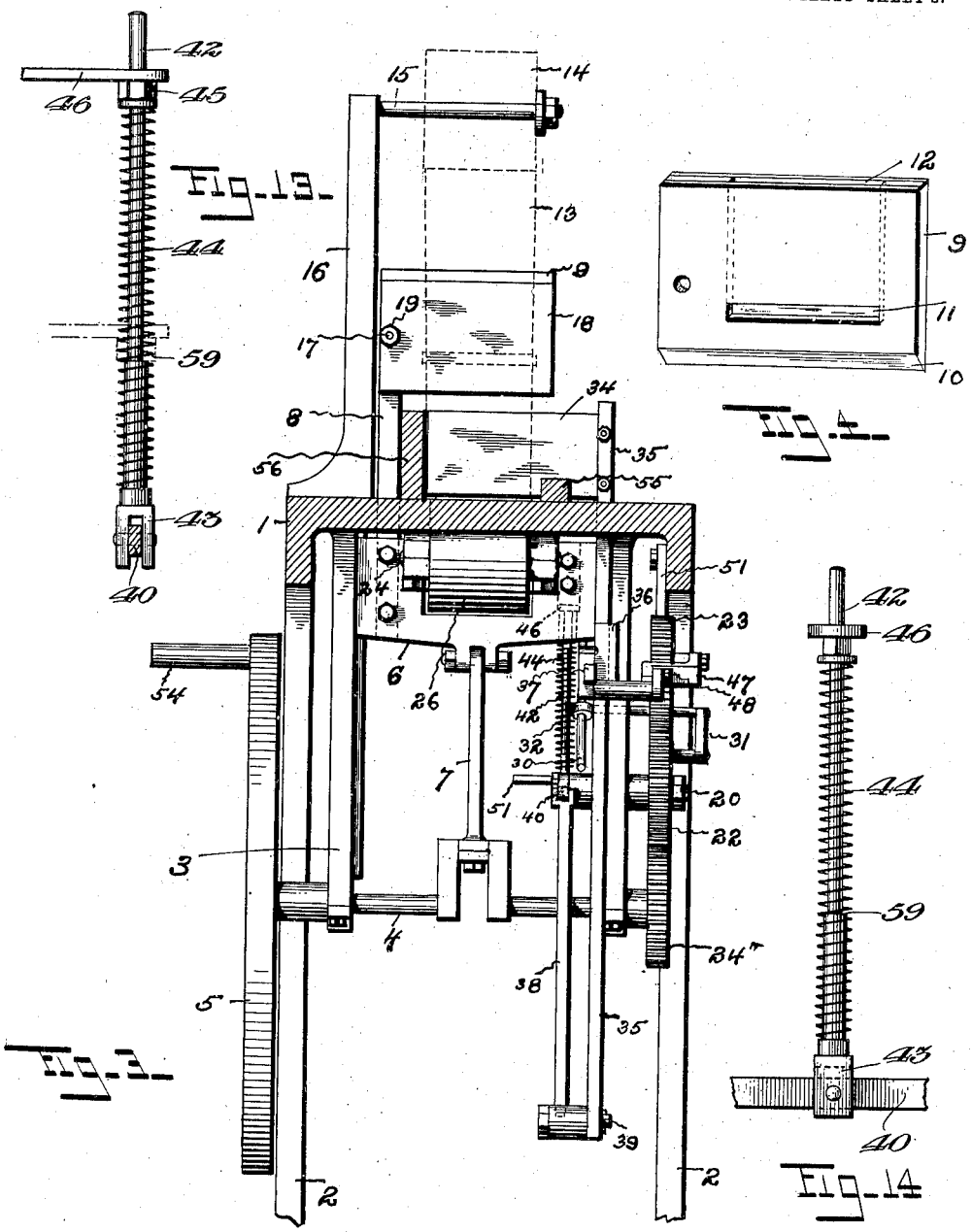

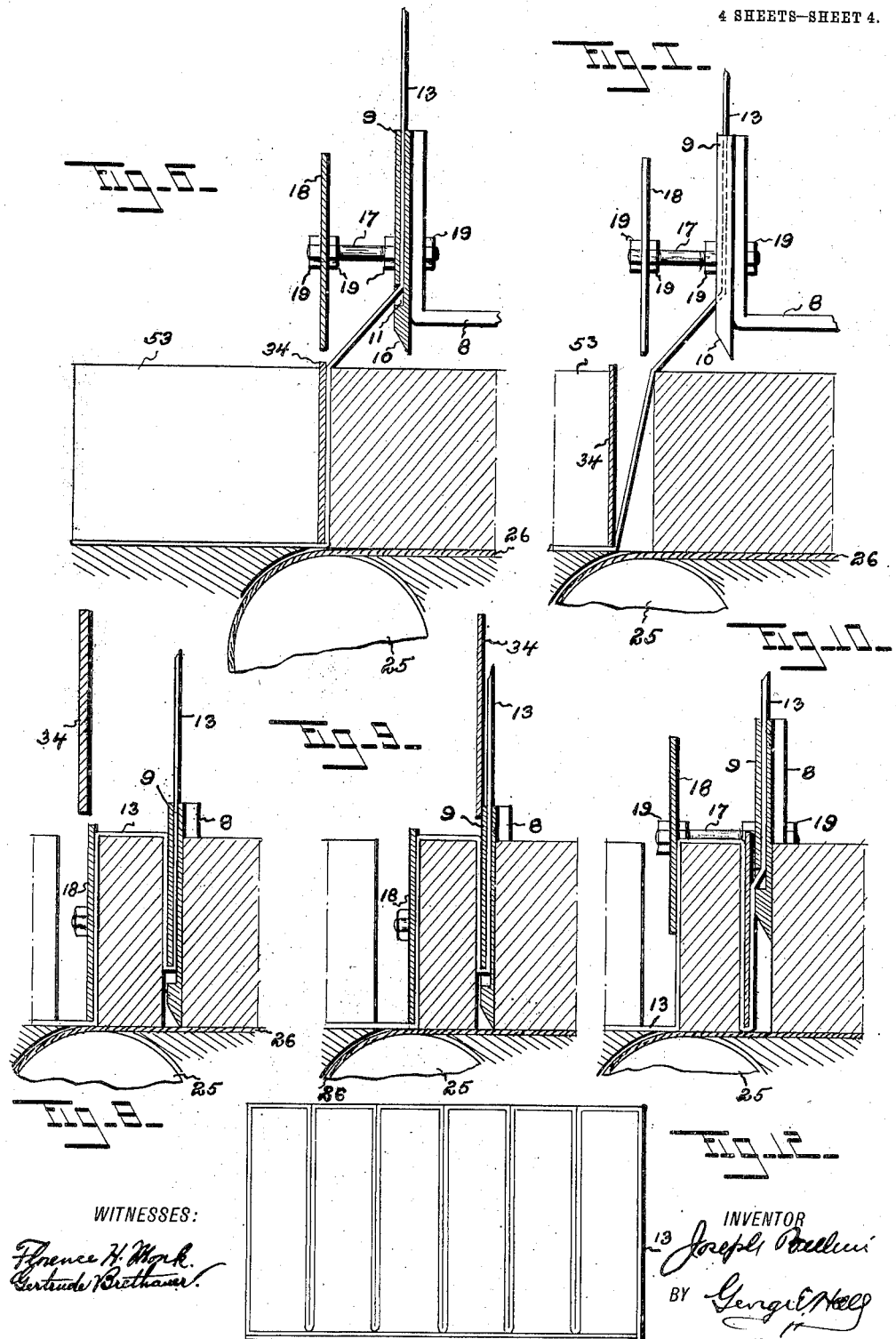

UNITED STATES PATENT OFFICE.

JOSEPH BELLINI, OF NEW HAVEN, CONNECTICUT.

ICE-CREAM CUTTING AND WRAPPING MACHINE.

983,421.  Specification of Letters Patent.  Patented Feb. 7, 1911.

Application filed October 23, 1909. Serial No. 524,195.

*To all whom it may concern:*

Be it known that I, JOSEPH BELLINI, a subject of Victor Immanuel III, King of Italy, residing at New Haven, in the county of New Haven and State of Connecticut, have invented certain new and useful Improvements in Ice-Cream Cutting and Wrapping Machines, of which the following is a specification, reference being had therein to the accompanying drawings.

My invention relates to new and useful improvements in ice cream cutting and wrapping machines and has for its object, among other things, to produce a machine that will automatically cut a brick of cream into pieces and wrap the same in paper at one and the same time, and produce these results with mechanism composed of the fewest possible parts that are of such simple design as to be economically constructed and readily assembled.

To these, and other ends, my invention consists in the ice cream cutting and wrapping machine, having certain details of construction and combinations of parts as will be hereinafter described and more particularly pointed out in the claims.

Referring to the drawings, in which like numerals of reference designate like parts in the several figures; Figure 1 is a fragmentary side view of my improved machine; Fig. 2 is a fragmentary plan view thereof; Fig. 3 is a sectional view upon line A—B of Fig. 1; Fig. 4 is a detail perspective view of the cutter; Fig. 5 is a view of the cutter and adjacent parts in their so-called zero positions; Fig. 6 is a similar view with the parts in the relative positions occupied by them after the brick has been advanced to its cutting position; Fig. 7 is a similar view after the feed plate has advanced beyond the end of the brick; Fig. 8 is a similar view with the cutter and guide plate in their down positions; Fig. 9 is a similar view with the feed plate brought into alinement with the cutter; Fig. 10 is a similar view with the feed plate in its down position and the cutter on its upward stroke; Fig. 11 is a perspective view of a brick of cream as taken from the machine; Fig. 12 is a side elevation of a brick of cream wrapped and ready for boxing; and Figs. 13 and 14 are detail views of the spring rod.

In the practice of my invention I provide a bed 1, which is supported upon suitable legs 2 and having a bracket 3 thereon within which is rotatably mounted the crank shaft 4 having a wheel 5 thereon. Movable vertically in said bracket by said crank shaft through the link 7, is a gate 6, to which is secured a bar 8 having a cutter 9 affixed to its upper end. This cutter is preferably constructed with a beveled lower edge 10, a slot 11 in its front face, and a second slot 12 extending from the first slot through the top of said cutter. Through both of these slots the paper 13 passes from the roll 14 upon the stud 15 in the standard 16. Connected substantially parallel with the cutter 9 by the bolt 17 is a guide plate 18 that moves with the cutter and is adjustable toward and away from it by means of the nuts 19 that are threaded onto the bolt 17. Fixed in one side of the bracket 3, and projecting laterally therefrom, are the studs 20 and 21, upon which are rotatably mounted the gears 22 and 23 which mesh into each other, and the first of which is driven from a gear 24″ fixed on the shaft 4.

Rotatably connected with the bed 1 are the shafts 24—24′ having the rolls 25 thereon connected by the endless belt 26 that rides upon a portion of the bed 27 so that the upper surface thereof is flush with the top of said bed. An intermittent movement is imparted to said rolls and belt through the ratchet disk 28 fixed to the shaft 24′, arm 30 that is rotatable upon said shaft, pawl 29 connected with said arm, spring 33 engaging said pawl, and link 31 connected at one end to the gear 22 and at the other end to a collar 32 adjustable upon the arm 20 and through which movement is imparted to the said arm.

The combined auxiliary feed and wrapping mechanism comprises a plate 34 fixed to the upper end of the rod 35, a frame 36 that is slidably mounted upon a bar 37 fixed to the bracket 1 and within which the said rod is vertically movable, a link 38 connected to the lower end of said rod by a pintle 39, a rock lever 40 that is pivotally mounted between its ends upon the stud 20 and secured at one end by the pintle 41 to the upper end of the link 38, a rod 42 having a head 43 upon its lower end that is pivotally connected to the rock lever 40, a spring 44 surrounding said rod, nut collar 45 slidable upon the upper end of said rod which contacts with a plate 46 fixed to the gate 6, and through which the rod 42 projects, a two-part link 47, one of said parts being connected with the gear 23, and the other to the box 36, and both adjustably secured together by the bolts 48 that pass through a slot 49 in one of said parts and are threaded in the other of said parts. During the rotation of the crank shaft 4 a crosswise movement is imparted to the plate 34 through the link connection between the gear 23 and frame 36 and a vertical movement from the gate 6 through the plate 46, rod 42, rock lever 40, link 38 and rod 35, the position of the rock lever 40 and adjacent parts when the gate is in its down position being shown by broken lines in Fig. 1. The spring 50 returns the rock lever 40 to its up position and against the stop 51. The path of movement of said plate being substantially rectangular. During the down movement of the plate 46, the spring 44 is compressed until the collar 45 contacts with the shoulder 59 on the rod 42, shown by broken lines in Fig. 13, when movement is imparted to the rock lever through said rod.

For convenience in description I have designated the zero position of the parts as that shown in Fig. 5, wherein the plate 34 is in its down position, the cutter and guide plate in their up positions, and the paper 13 from the roll passed down through the slots 12 and 11 underneath the lower edge of the plate 34 onto the top of the bed with a block 53, of wood or other similar material, that lies between the guides 55—56, resting upon the paper with one face thereof against the plate 34, and the ice cream brick resting upon the belt 26, one side being against the guide 52 and its end against the paper contacting with the plate 34. The belt now begins to rotate and the plate 34 to move forward, the brick and said plate occupying their same relative positions until the brick is in the position shown in Fig. 6, wherein its front end is substantially over the center of the shaft 24, at which time the forward movement by the belt is discontinued but the plate 34 continues its movement until it arrives at the position shown in Fig. 6, the paper 13 during all of these movements being drawn through the cutter from the roll 14. The cutter begins to move downwardly and passes through the brick, cutting off the front portion thereof, while the guide plate 18 supports it and folds the paper close against its front end, as shown in Fig. 8, wherein the cutter and guide plate are in their down positions. The plate 34 during the downward movement of the cutter bar moves upwardly to the position shown in Fig. 8, and while the cutter is in its down position is moved crosswise over the several cut off portions of the brick to the position shown in Fig. 9, after which the cutter moves upwardly and said plate downwardly, passing over the front face of the cutter, contacting with the paper strip, as shown in Fig. 10, and moving the same to the bottom of the brick, thus covering with paper three sides of said cut off portion. After the cutter has returned to its up position all of the parts again occupy their zero positions but now the cut off portion of the cream brick is in front of the plate 34 instead of the block, as at the beginning of the operations. The above movements are continued until the entire brick of cream is cut into a predetermined number of portions regulated in size by the relative positions of the cutter and guide plate, at which time the block 53 is lifted off the end of the paper strip and the cut brick taken out of the machine with an additional strip of paper sufficiently long to cover one face of the brick. It is then torn off and the overlapping ends 57 and 58 of the paper folded over one of the uncovered sides of the brick, as shown in Fig. 12, thus completing the operation.

There are minor changes and alterations that can be made within my invention, and I would therefore have it understood that I do not limit myself to the exact construction herein shown and described, but claim all that falls fairly within the spirit and scope of my invention.

Having described my invention, what I claim as new, and desire to secure by Letters Patent, is:—

1. In a machine of the character described, the combination with means for cutting a brick of ice cream or similar substance into pieces; means for wrapping paper around portions of said pieces; and means for guiding said paper in part by said cutting means.

2. In a device of the character described, the combination with means for cutting a brick of ice cream or similar substance into pieces of substantially uniform size; means for intermittently moving said brick under said cutter; means for successively wrapping paper around a portion of each of said pieces; and means for holding said paper against the end of said brick while the cutter is in contact therewith.

3. In a device of the character described for producing a completed package of ice cream or similar substance cut into a plurality of separate pieces of predetermined size, the combination with means for separately wrapping each of said pieces in portions of a single piece of wrapping material, of means for assembling each wrapped piece with the next preceding wrapped piece.

4. In a device of the character described, the combination with means for imparting an intermittent movement to a brick of ice cream or similar substance; of means for cutting off a piece thereof between each successive movement; means for separately wrapping said pieces in portions of a single piece of wrapping material; and means for moving each of said cut off pieces after the wrapping operation in advance of the uncut portion, and assembling it with the next preceding cut off piece.

5. In a device of the character described, the combination with means for imparting an intermittent movement to a brick of ice cream or similar substance; of a cutter; means for operating the same so that it will pass down through said brick between each successive intermittent movement thereof; and means for applying paper to said cut off portion during the cutting movement of said cutter.

6. In a device of the character described, the combination with means for imparting an intermittent movement to a brick of ice cream or similar substance; of means for cutting off a portion of said brick between each successive intermittent movement; means for wrapping paper around said cut off portion during the operation of the cutting means, said paper being carried by said cutting means.

7. In a device of the character described, the combination with means for imparting an intermittent movement to a brick of ice cream or similar substance; of a cutter for severing a portion of said brick during each successive intermittent movement; a plate movable with said cutter; and means for holding a strip of paper in relation to said brick so that the movement of said plate and cutter will wrap said paper around portions of said cut off piece.

8. In a device of the character described, the combination with means for imparting an intermittent movement to a brick of ice cream or similar substance; of a cutter having a paper opening therein; a guide plate movable with said cutter; means for presenting a strip of paper to said brick through said cutter opening so that the movement of said cutter and guide plate during the cutting operation will, at the same time, wrap said paper around portions of said cut off portion.

9. In a device of the character described, the combination with means for imparting an intermittent movement to a brick of ice cream or similar substance; of means for cutting off a portion of said brick during each successive intermittent movement; means for applying paper to portions of said brick during the cutting operation; and means for moving said wrapped cut off portion in advance of said brick and before the next stroke of the cutter, without severing said paper.

10. In a machine of the character described, the combination with means for cutting a brick of ice cream or similar substance into pieces; of means for wrapping paper around portions of each of said pieces; and means for moving each of said wrapped pieces in advance of the uncut portion of said brick, said wrapping and moving means having a substantially rectangular movement.

In testimony whereof I affix my signature in presence of two witnesses.

JOSEPH BELLINI.

Witnesses:
GEORGE E. HALL,
FREDERICK M. WARD.